April 8, 1958     J. A. HERRMANN ET AL     2,830,137
TROLLEY DUCT AND COLLECTOR THEREFOR
Original Filed July 1, 1950
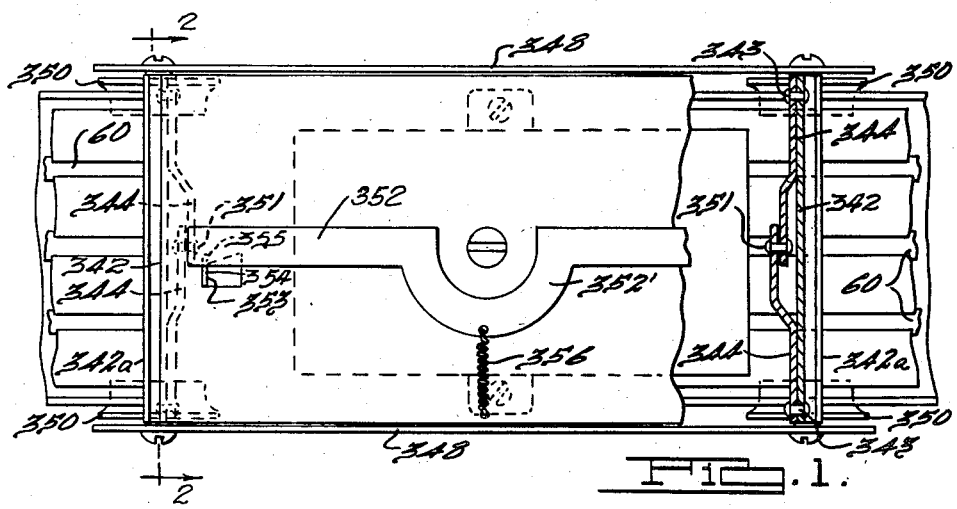
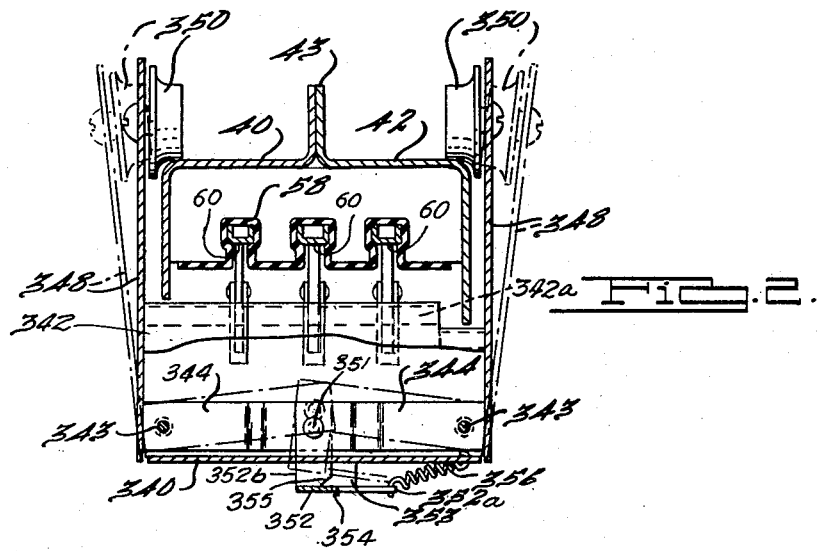
INVENTORS.
John A. Herrmann.
Elwood T. Platz.
BY
*S. Eugene Bychinsky*
THEIR ATTORNEY.

United States Patent Office 2,830,137
Patented Apr. 8, 1958

2,830,137

TROLLEY DUCT AND COLLECTOR THEREFOR

John A. Herrmann, Grosse Pointe Farms, and Elwood T. Platz, Detroit, Mich., assignors, by mesne assignments, to I-T-E Circuit Breaker Company, Philadelphia, Pa., a corporation of Pennsylvania Original application July 1, 1950, Serial No. 171,588, now Patent No. 2,696,532, dated December 7, 1954. Divided and this application August 24, 1954, Serial No. 451,883

2 Claims. (Cl. 191—23)

This invention relates to electrical distribution systems of the trolley duct type, and particularly to novel trolleys useful in such systems. This application is a division of pending application No. 171,588, filed July 1, 1950, now Patent No. 2,696,532.

A principal object of the present invention is to provide a novel type of trolley arranged to provide a high degree of smoothness of movement along the duct and also arranged to be separable so as to be readily applicable to, or removable from, a duct at any point thereof.

A further object is to provide a novel form of trolley useful particularly with a duct of the open channel type with the trolley having sides and a bottom which completely shield the trolley contacts at their points of engagement with the bus bars.

Generally, the trolley herein described comprises a bottom plate and side plates with the latter having rollers for riding on the upper surface of the channel duct. The lower or bottom surface of the trolley is formed with upwardly projecting contactors or collectors which engage the undersurfaces of bus bars that may be mounted in the channel duct and exposed to the open bottom of the duct. The bottom wall of the trolley may be formed with upwardly extending end portions to complete the enclosure of the space under the duct encompassed by the trolley so that the collectors and contactors within the trolley are completely shielded from outside the trolley. A more complete description of a duct configuration that is particularly suitable for use with the trolley of the instant invention may be had by reference to patent application No. 164,247, filed on May 25, 1950, now U. S. Patent 2,675,434, and assigned to the assignee of the present invention.

Details of construction of the trolley herein disclosed will best be understood upon reference to the appended drawings, wherein:

Fig. 1 is a bottom plan view of the trolley showing parts cut away.

Fig. 2 is an end view of the trolley with parts cut away.

A trolley duct, more fully described in the aforementioned co-pending application, may include a casing made up of two halves 40—42 (Fig. 2). Each is of "ogee" form and has a central flange 43. Meeting flanges 43 may be riveted together by rivets passed through rivet holes, some of which holes may be utilized to receive bolts or other fastening means enabling the duct to be connected to vertical hangers (not shown).

Running from end to end of each unit length is an insulation liner 58 of thin, flexible insulation material rigid enough to be shape-sustaining and self-supporting but flexible enough to be bent on longitudinal edges of its ridges to permit U-shaped bus bars 60 of the form shown in Fig. 2 to be held by shoulders of the insulation liner 58.

For use with the open bottom channel type trolley duct briefly described, there is provided a trolley (Figs. 1 and 2 of this application) comprising a base or bottom plate 340 which may be of sheet metal having bent-up ends or end plates 342 (Fig. 1). End plates 342 have pins 343 which provide pivots for links 344 integrally connected to side plates 348 upon which are the rollers 350. The pairs of links 344 are centrally connected as at 351, and bail extensions 352b connect the central pin connections 351 with the bail 352 extending longitudinally under the base plate 340. Projecting downwardly from the base plate are lugs 353 having stop surfaces 354 and cam surfaces 355. A spring 356 connects the bail 352 to base plate 340 and biases the bail to the right, Fig. 2.

Normally the bail is positioned under the stop lugs 353 so that the stop surfaces 354 of these lugs are engaged by the bail 352, and this holds the central pivots 351 and links 344 down and thus holds the side plates 348 close to each other in the duct engaged position, as seen in the solid lines of Figure 2.

However, if the bail 352 is initially moved to the left manually (Fig. 2), it will disengage stop surface 354 and then automatically it will move up and to the right on cam surface 355 toward the base plate 340 and release the central pivots 351 so that the links 344 can rock on their stationary pivots 343 and thus rock the side plates 348 outwardly to release the trolley. That is after the bail 352 is manually moved to the left, spring 356, secured to section 352a of bail 352, biases bail 352 against cam surfaces 355 of lugs 353 and causes the bail to follow this surface. This position is seen in dotted lines in Figure 2.

When the side plates 348 are moved toward each other manually, i. e., towards closed or duct-engaged position, they move the links 344 so that the central pivots 351 move downwardly (Figure 2) whereupon the bail 352 will initially ride down and to the left (as seen in Figure 2) on the cam surfaces 355 of the lugs 353 projecting down from the base plate and finally cross over the intersections of surfaces 355—354 and hook under the stop surfaces 354 of these lugs 353 to restore the side walls to duct-engaged position, as seen in the solid lines of Figure 2.

The trolley is equipped with the fuse block, connectors and contactors disclosed in application Serial No. 171,588, now U. S. Patent 2,696,532, hereinabove mentioned.

It will be observed that the trolley herein described is designed especially for use with the open channel type of duct here disclosed and is formed to ride freely on the horizontal upper surface of such channel, with the collectors projecting upwardly from the bottom of the trolley to the bus bars through the open bottom of the channel. The bottom plates of the trolley, together with the side plates and end plates, form a complete and effective shield around the collectors of the trolley and with the points of contact of such collectors with the duct bus bars.

We claim:

1. For use with a trolley duct comprising an open bottom channel casing of inverted U form and having bus bars or rails under the casing and exposed on their own undersurfaces, a trolley type collector having a bottom plate, two side plates movably connected thereto at their lower portions and having supporting rollers on and inside their upper portions for rolling on the top wall of the casing, bus bar contactors on the bottom plate projecting upwardly to engage the bus bars or rails, and actuating means movable to bias the side plates of the collector toward each other, support means secured to said bottom plate disengageable locking means within the trolley type collector whereby said rollers interlock over the top wall of the casing when said locking means is engaged with said support means and positively separate and remain separated when said locking means is disengaged from said support means, said disengageable locking means comprising a toggle linkage and spring means; said actuating means being supported from disengageable locking means.

2. For use with a trolley duct comprising an open bottom channel casing of inverted U form and having bus bars or rails under the casing and exposed on their own undersurfaces, a trolley type collector having a bottom plate, two side plates movably connected thereto at their lower portions and having supporting rollers on and inside their upper portions for rolling on the top wall of the casing, bus bar contactors on the bottom plate projecting upwardly to engage the bus bars or rails, disengageable locking means comprising projections extending inwardly from each end of said side plates, linked into toggles, a bail below said bottom plate pivotally connected to said toggles for upwardly effectuating a simultaneous release of both side plates thereby releasing said trolley collector for removal from said duct, a lug secured to the bottom surface of said bottom plate and having a cam surface and bottom surface said bail engaging said bottom surface of said lug when said rollers are interlocked over the top of said duct, said bail being constucted and operatively positioned to permit said bail to move into engagement with said cam surface and spring means rotatably urging said bail against said cam surface, said bail being manually moved along said cam surfaces to permit said bail to engage said bottom surface as said rollers are being interlocked over the top of said duct.

References Cited in the file of this patent

UNITED STATES PATENTS

Re. 19,513     Frank et al. _____ Apr. 2, 1935